(12) United States Patent
Shmidt

(10) Patent No.: US 8,976,735 B1
(45) Date of Patent: *Mar. 10, 2015

(54) CHANNEL SCANNING

(71) Applicant: Google Inc., Mountain View, CA (US)

(72) Inventor: Dmitry Shmidt, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/020,211

(22) Filed: Sep. 6, 2013

Related U.S. Application Data

(63) Continuation of application No. 12/957,778, filed on Dec. 1, 2010, now Pat. No. 8,553,617.

(51) Int. Cl.
 *H04W 4/00* (2009.01)
 *H04W 24/00* (2009.01)

(52) U.S. Cl.
 CPC ..................... *H04W 24/00* (2013.01)
 USPC ........ 370/328; 370/310; 455/434; 455/452.1; 455/456.1; 455/457

(58) Field of Classification Search
 CPC ... H04W 68/025; H04W 88/06; H04W 68/02; H04W 24/00
 USPC ............ 370/328, 310; 455/434, 452.1, 456.1, 455/457
 See application file for complete search history.

(56) References Cited

U.S. PATENT DOCUMENTS

| | | | |
|---|---|---|---|
| 7,327,258 B2 * | 2/2008 | Fast et al. ................... | 340/572.1 |
| 7,397,424 B2 | 7/2008 | Houri | |
| 7,403,762 B2 | 7/2008 | Morgan et al. | |
| 7,414,988 B2 | 8/2008 | Jones et al. | |
| 7,433,694 B2 | 10/2008 | Morgan et al. | |
| 7,457,620 B2 | 11/2008 | Lam et al. | |
| 7,515,578 B2 | 4/2009 | Alizadeh-Shabdiz et al. | |
| 7,696,923 B2 | 4/2010 | Houri | |
| 7,768,960 B1 | 8/2010 | Barratt | |
| 8,144,673 B2 | 3/2012 | Alizadeh-Shabdiz | |

(Continued)

OTHER PUBLICATIONS

"Beacon-Stuffing: Wi-Fi Without Associations", (Paper), R. Chandra, J. Padhye, L. Ravindranath, and A. Wolman, Proceedings of the Eighth IEEE Workshop on Mobile Computing Systems and Applications (HotMobile '07), pp. 53-57, Tucson, AZ, USA, 2007. IEEE Computer Society. (http://research.microsoft.com/pubs/73482/beaconstuffing.pdf), 6 pages.

(Continued)

*Primary Examiner* — Hassan Kizou
*Assistant Examiner* — Deepa Belur
(74) *Attorney, Agent, or Firm* — Fish & Richardson P.C.

(57) ABSTRACT

Methods, systems, and apparatus, including computer programs encoded on a computer storage medium, for channel scanning. In one aspect, a method includes, while maintaining an association with a first access point on a first channel during first, second, and third consecutive time slices: (i) monitoring, by a client device, a single second channel during the first time slice and the third time slice, and (ii) monitoring, by the client device, the first channel during the second time slice; receiving a beacon from a second access point during the first time slice or the third time slice; and determining a property of the client device or the second access point using the beacon, without using the beacon to determine whether to establish an association with the second access point.

20 Claims, 3 Drawing Sheets

(56) References Cited

U.S. PATENT DOCUMENTS

| | | | |
|---|---|---|---|
| 8,185,129 B2 | 5/2012 | Alizadeh-Shabdiz | |
| 8,238,268 B1 | 8/2012 | Shmidt | |
| 8,611,847 B2* | 12/2013 | Snider et al. | 455/404.1 |
| 2002/0071405 A1 | 6/2002 | Kelley et al. | |
| 2004/0015602 A1* | 1/2004 | Goldhammer et al. | 709/235 |
| 2004/0203689 A1 | 10/2004 | Backes et al. | |
| 2004/0264413 A1 | 12/2004 | Kaidar et al. | |
| 2005/0047407 A1* | 3/2005 | Desai et al. | 370/389 |
| 2005/0286446 A1* | 12/2005 | Barber | 370/278 |
| 2006/0014536 A1 | 1/2006 | Demirhan et al. | |
| 2006/0078122 A1 | 4/2006 | Dacosta | |
| 2006/0215627 A1 | 9/2006 | Waxman | |
| 2006/0221918 A1 | 10/2006 | Wang | |
| 2007/0201420 A1 | 8/2007 | Tejaswini et al. | |
| 2007/0288645 A1* | 12/2007 | Kass | 709/230 |
| 2009/0088183 A1 | 4/2009 | Piersol et al. | |
| 2009/0116400 A1* | 5/2009 | Sekiya et al. | 370/252 |
| 2009/0122757 A1 | 5/2009 | Cave et al. | |
| 2010/0110921 A1 | 5/2010 | Famolari et al. | |
| 2010/0110949 A1 | 5/2010 | Lundsgaard | |
| 2010/0208598 A1 | 8/2010 | Tsai et al. | |
| 2010/0260092 A1* | 10/2010 | Nagaraja | 370/315 |
| 2010/0278077 A1 | 11/2010 | Reunamäki et al. | |
| 2010/0302982 A1* | 12/2010 | Hsu et al. | 370/311 |
| 2011/0028160 A1 | 2/2011 | Roeding et al. | |
| 2011/0096678 A1 | 4/2011 | Ketonen | |
| 2011/0103242 A1 | 5/2011 | Hittel et al. | |
| 2011/0165873 A1 | 7/2011 | Gidvani | |
| 2011/0176434 A1* | 7/2011 | Pandey et al. | 370/252 |
| 2014/0086062 A1* | 3/2014 | Lightstone et al. | 370/241 |
| 2014/0228070 A1* | 8/2014 | Josso et al. | 455/552.1 |

OTHER PUBLICATIONS

"Beacon-Stuffing: Wi-Fi Without Associations", (Presentation), Ranveer Chandra, Jitendra Padhye, Lenin Ravindranath, Alec Wolman, Proceedings of IEEE HotMobile, Tucson, AZ (Feb. 26-27, 2007), PowerPoint Presentation http://research.microsoft.com/en-us/projects/wifiads/beaconstuffinghotmobile.ppt , 20 pages.

"Google's submission today to several national data protection authorities on vehicle-based collection of wifi data for use in Google location based services", Raphael Leiteritz, Product Manager, Google, Apr. 27, 2010, http://static.googleusercontent.com/external_content/untrusted_dlcp/www.google.com/en/us/googleblogs/pdfs/google_submission$_{13}$ dpas_wifi_collection.pdf , 4 pages.

"Enterprise WLAN Security Challenges and Solutions," Brocade Communications Systems, Inc., Copyright 2009, reprinted from http://www.brocade. com/downloads/documents/white_papersIWLAN_Enterprise_Security-WP 00 .pdf.

"Finding Yourself—Experimental Location Technology Relies on Wi-Fi and Cellphone signals instead of orbiting satellites", Anthony LaMarca, Yatin Chawathe and Ian Smith, http://spectrum.ieee.org/computing/networks/finding-yourself, Dec. 2004 , 3 pages.

"Google's Approach of a "_NOMAP" Wi-Fi Zone", Ajay Gupta, InfoSecurity Magazine, Blog, Nov. 20, 2011 http://www.infosecurity-magazine.com/blog/2011/11/20/googles-approach-of-a-nomap-wifi-zone/460.aspx , 2 pages.

"Improving Crowd-Sourced Wi-Fi Localization Systems using Bluetooth Beacons", in Proceedings of IEEE International Conference on Sensor, Mesh, and Ad hoc Communication Networks (SECON), Seoul, Korea, Jun. 2012. http://spirit.cs.ucdavis.edu/pubs/conf/jindan-secon.pdf , 9 pages.

"Indoor Triangulation System, Tracking Wireless Devices Accurately", Whitepaper, Navizon, Copyright 2011 http://www.navizon.com/its/whitepaper.pdf , 9 pages.

"LifeTag:WiFi-based Continuous Location Logging for Life Pattern Analysis", Jun Rekimoto, Takashi Miyaki and Takaaki Ishizawa, Proceedings of LoCA'07 Proceedings of the 3rd international conference on Location-and context-awareness , http://www.sonycsl.co.jp/person/rekimoto/papers/loca07.pdf , 15 pages.

"Neighborcast: Enabling Communication Among Nearby Clients" (Paper), Ranveer Chandra, Jitendra Padhye, Lenin Ravindranath, Proceedings of IEEE HotMobile, Napa, CA (Feb. 25-26, 2008) http://research.microsoft.com/en-us/projects/wifiads/neighborcast.pdf , 6 pages.

"Neighborcast: Enabling Communication Among Nearby Clients", (Presentation), Ranveer Chandra, Jitendra Padhye, Lenin Ravindranath, Proceedings of IEEE HotMobile, Napa, CA (Feb. 25-26, 2008) PowerPoint Presentation: http://research.microsoft.com/en-us/projects/wifiads/hotmobile-neighborcast.pptx ,24 pages.

"Precise Indoor Localization Using Smart Phones", Eladio Martin et al, MM'10, Oct. 25-29, 2010, Firenze, Italy. http://www.icsi.berkeley.edu/pubs/speech/preciseindoor10.pdf , 4 pages.

"Release Notes for Cisco Wireless LAN Controllers and Lightweight Access Points for Release 4.2.205.0," Cisco Systems, Inc., Copyright 2009, reprinted from http://www.cisco.com/en/US/docs/wireless/controller/release/notesIDcrn42205D3MR4.pdf.

"Self-Mapping in 802.11 Location Systems", Anthony LaMarca et al, Proceedings of the Seventh International Conference on Ubiquitous Computing (Ubicomp 2005), Lecture Notes in Computer Science, 18 pages.

"VoWLAN myths busted," Asco Wireless Solutions, Oct. 2006, reprinted from http://www.ascom.com/cn/vowlan-myths. pdf.

"Wi-Fi Geolocation—the Navizon Crowd-Sourcing Approah is a Proven Success", Indoor LBS—Indoor GPS Location, Maps, Navigation, May 2010, http://www.indoorlbs.com/2010/05/wi-fi-geolocation-navizon-crowd.html , 2 pages.

"Wi-Fi positioning system", Wikipedia, http://en.wikipedia.org/wiki/Wi-Fi_positioning_system (accessed from the Internet on Aug. 9, 2012), 2 pages.

"WiFiAds: Delivering Location Sensitive Ads Using Wireless Networks", Ranveer Chandra, Jitendra Padhye, Lenin Ravindranath, Alec Wolman., MSR TechFest Poster (Mar. 2007) http://research.microsoft.com/en-us/projects/ wifiads/wifiadstechfest.pptx , 1 page.

Castignani, G., Montavont, N., "Adaptive System for 802.11 Scanning," INFOCOM Workshops 2009, IEEE, pp. 1-2,Apr. 19-25, 2009, 978-1-4244-3968-3.

Geier, J., "802.11 Beacons Revealed," dated Oct. 31, 2002, reprinted from http://WVvW.wi-fiplanet.com/tutorials/article.php/1492071/80211-Beacons-Revealed.htm on Sep. 3, 2010.

Geier, J., "Understanding 802.11 Frame Types," dated Aug. 15, 2002, reprinted from http://WVvW.wi-fiplanet.com/tutorials/article. php/144 7 50 1/ U nderstanding-80211-Fr ame-Types. htm on Sep. 3, 2010.

Lopez-Vargas, Gustavo E., Final Office Action (U.S. Appl. No. 12/957,778) dated Jun. 11, 2013, 26 pages.

Thornycroft, Peter "Handover Mechanics for Wi-Fi Phones: Handover Defined," Aruba Networks, May 28, 2007, reprinted from http://airheads.arubanetworks.com/article/handover-mechanics-wi-fi-phones-handover-defined on Aug. 31, 2010.

Office Action issued in U.S. Appl. No. 13/250,219 on Dec. 11, 2011, 18 pages.

Notice of Allowance issued in U.S. Appl. No. 13/250,219 on May 4, 2012, 9 pages.

Office Action issued in U.S. Appl. No. 12/957,778 on Jan. 7, 2013, 31 pages.

Office Action issued in U.S. Appl. No. 12/957,778 on Jun. 11, 2013, 26 pages.

Notice of Allowance issued in U.S. Appl. No. 12/957,778 on Aug. 19, 2013, 8 pages.

\* cited by examiner

CHANNEL SCANNING

CROSS-REFERENCE TO RELATED APPLICATION

This application is a continuation of and claims priority from U.S. application Ser. No. 12/957,778, filed Dec. 1, 2010, the entire contents of which are incorporated by reference herein.

BACKGROUND

The present specification relates to wireless communication.

Many wireless communications systems are designed to transmit and receive information over one of multiple frequency channels. By tuning a transceiver to a particular frequency, a device can communicate over a particular channel. At some point after the device has communicated over one channel, the transceiver can be tuned to a new frequency to communicate over a new channel. Frequently, a device tunes a transceiver to a new channel to establish an association, or in other words, to establish an ongoing connection with an access point that provides access to a network.

SUMMARY

While a client device maintains an association with a first access point on a first channel, the client device can receive information over a second channel. The client device switches between a first channel and a second channel to receive information on both channels at different times. On the second channel, the client device receives a beacon from an access point that with which the client device is not associated. The client device can use the beacon to determine a property of the client device or the access point, without using the beacon to evaluate the potential for association on the second channel. The property can be used to provide customized information to the client device.

One aspect of the subject matter described in this specification is embodied in methods that include the actions of monitoring a single secondary channel during alternate time slices while maintaining an association with a first access point on a primary channel. A beacon can be received that is used not to determine whether to establish a new association, but rather to determine a property of the client device or a second access point.

In general, another aspect of the subject matter described in this specification may be embodied in methods that include the actions of: while maintaining an association with a first access point on a first channel during first, second, and third consecutive time slices: monitoring, by a client device, a single second channel during the first time slice and the third time slice, and monitoring, by the client device, the first channel during the second time slice; receiving a beacon from a second access point during the first time slice or the third time slice; and determining a property of the client device or the second access point using the beacon, without using the beacon to determine whether to establish an association with the second access point.

Other implementations of these aspects include corresponding systems, apparatus, and computer programs, configured to perform the actions of the methods, encoded on computer storage devices.

These and other implementations may each optionally include one or more of the following features. For instance, a transceiver of the client device maintains the association with the first access point and monitors the single second channel; the transceiver is tuned to the first channel during the second time slice; data is exchanged between the client device and the first access point during the second time slice; the first time slice and the third time slice each have a duration greater than a beacon transmission interval of the first access point; both (i) the ratio of the duration of the first time slice to the duration of the second time slice and (ii) the ratio of the duration of the third time slice to the duration of the second time slice are greater than 2 to 1; and/or both (i) the ratio of the duration of the first time slice to the duration of the second time slice and (ii) the ratio of the duration of the third time slice to the duration of the second time slice are approximately 5 to 1.

Advantageous implementations can include one or more of the following features. Information transmitted on a channel other than the channel of association can be received, even when the beacons are transmitted infrequently. The client device can obtain information about a property of the client device or of an access point. Using a property of the client device or the access point, information customized to the client device can be obtained.

A secondary channel can be scanned while an association on a primary channel is maintained. For a time period including many time slices, the amount of time monitoring a secondary channel can be greater than the amount of time tuned to the primary channel. A property of a second access point or the client device can be determined using a beacon received over the secondary channel, without using the beacon to determine whether to establish an association with the second access point.

The details of one or more implementations are set forth in the accompanying drawings and the description below. Other features and advantages will become apparent from the description, the drawings, and the claims.

DETAILED DESCRIPTION

Figure 1:
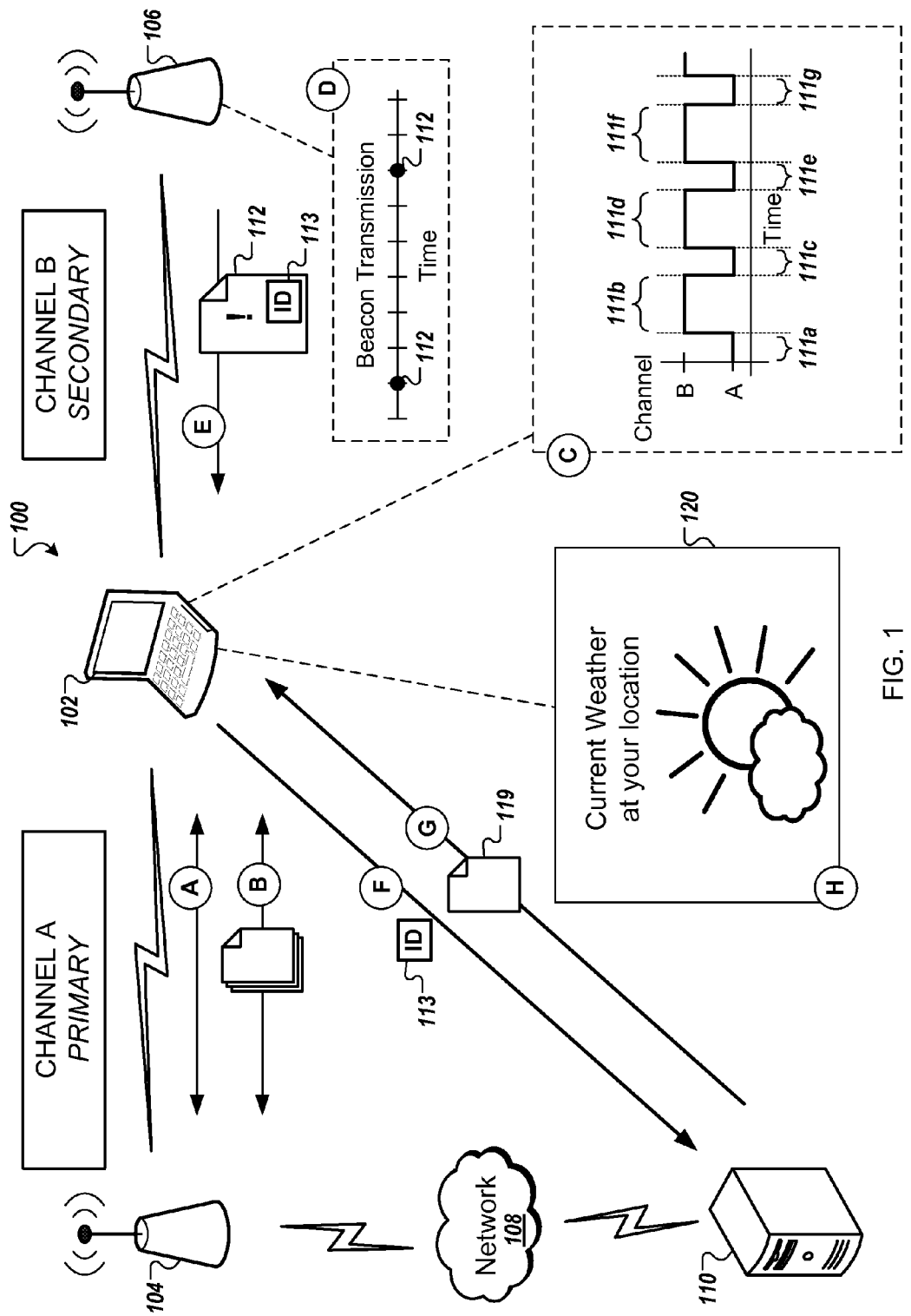
FIG. 1 is a diagram of a system that performs channel scanning

FIG. 1 is a diagram of a system that performs channel scanning FIG. 1 also illustrates a flow of data, shown in states (A) to (H), as well as a user interface 120 that is shown on a mobile client computing device ("client device") 102 during state (H). States (A) to (H) may occur in the illustrated sequence, or they may occur in a sequence that is different than the illustrated sequence.

Most client devices exchange data over a single frequency channel at a time. A client device usually requests association with a particular access point on a primary channel and maintains that association for an extended period of time. While the association is intact, the client device maintains communication over a network through the access point. If the client device does not transmit any information to an access point for a long time, for example if the client device tunes a wireless transceiver away from the primary channel for a long time, the client device may lose the association with the access point. This can cause pending data transfers to be terminated and cause the client device to lose the connection to the network.

To receive information over a secondary channel and still maintain an association on a primary channel, the client device can tune to the secondary channel for a short time and then return to the primary channel. The client device can tune to a single secondary channel repeatedly to increase the likelihood that information will be received while tuned to the secondary channel.

Because the client device returns to the first channel frequently, the association with the first access point can be maintained. By repeatedly monitoring the same second channel during alternate time periods, the client device can monitor a single secondary channel for a significant amount of time. This enables the client device to receive a beacon frame (a "beacon") over the second channel even when the beacon is transmitted relatively infrequently. The client device can receive a beacon from over the second channel that is sent not to facilitate an association with a second access point, but rather to transmit information about a property of the second access point or the client device.

System 100 includes the client device 102, a first access point 104, a second access point 106, a network 108, and a server system 110.

Examples of client devices 102 include laptop computers, cellular phones, and tablet computers. The client device 102 includes a processor, memory, input devices, and output devices. For example, the client device 102 includes a screen on which a user interface 120 or other output can be displayed.

The client device 102 may include a wireless transceiver. The client device 102 may include only one wireless transceiver, or more than one wireless transceiver. The wireless transceiver includes a wireless receiver and a wireless transmitter. The wireless transceiver can be capable of sending and receiving information over each of multiple radio frequency channels, but may be configured to communicate over only one channel at a time. The client device 102 can be enabled to programmatically tune the wireless transceiver from one channel to another channel. Switching from one channel to another may involve tuning a radio of the wireless transceiver from one frequency band to another frequency band.

The first access point 104 can include a wireless transceiver including a radio that can receive and transmit radio frequency signals. The radio can be tuned to a particular frequency channel. For example, for communication according to the 802.11 standard, the radio may be tuned to one of 14 standard channels in the 2.4 GHz range. The radio may also be configured for operation according to the 802.16 standard as well as other frequencies and protocols. The channel on which the first access point 104 operates is referred to as "channel A."

The first access point 104 can establish an association with the client device 102. The access point can receive data from and transmit data to the client device 102 while the association is maintained. For example, the first access point 104 may pass data between the client device 102 and the network 108.

The second access point 106 can include a radio configured to transmit data over a frequency channel different from the channel of the first access point 104. The second access point 106 may be capable of transmitting on any of multiple frequency channels, including channel A, but may be configured to transmit on a particular frequency channel other than channel A. The transmitter of the second access point 106 can be configured to operate according to the same standards, protocols, and frequency ranges as the radios of the first access point 104 and the client device 102. The channel of operation for the second access point 106 is referred to as "channel B."

In one implementation, the second access point 106 may not accept or respond to association requests from the client device 102. The second access point 106 may likewise not provide the client device 102 with a connection to the network 108. In some instances, the second access point 106 may not monitor or respond to transmissions from the client device 102 or other traffic on channel B.

The network 108 may include a local area network and/or wide area network, and may include the Internet. The server system 110 can be configured to transmit and receive information over the network 108, for example, to provide information in response to a query or request.

During state (A), the client device 102 establishes an association with the first access point 104 on a primary channel (in the figure, "channel A"). The radio of the client device 102 can be tuned to channel A. The client device 102 may receive, over the primary channel, a beacon (not shown) that identifies the first access point 104 and describes the connection available to the client device 102. The beacon may include a timestamp, an identifier for the first access point 106, and other information to facilitate an association with the first access point 104.

The client device 102 can then request association with the first access point 104 by sending an association request frame in response to the beacon. The first access point 104 and the client device 102 can exchange data to authenticate the client device 102, and the first access point can respond to the association request with an association response frame that accept the association of the client device 102.

During state (B), the client device 102 exchanges data with the first access point 104 over the primary channel. While the association between the client device 102 and the first access point 104 is maintained, the first access point 104 connects the client device 102 to the network 108. Data exchanged between the client device 102 and the first access point 104 is transferred wirelessly over channel A.

Maintaining an association with the first access point 104 does not require the transceiver of the client device 102 to be exclusively tuned to the primary channel, as will be discussed in greater detail. For example, a client device 102 can monitor channels other than the primary channel while communication over channel A is not occurring and still maintain the association with the first access point. The client device 102 can also interrupt communication over channel A to monitor another channel and maintain the association if the client device 102 continues communicating over channel A soon afterward.

During state (C), the client device 102 monitors a secondary channel (in the figure, "channel B"). The client device 102 can alternate tuning the transceiver of the client device 102 between the primary channel and the secondary channel. The tuning of the transceiver can be different for different time periods, or time slices 111a-111g. The client device 102 can automatically tune the transceiver according to a predefined pattern.

For example, the client device 102 can tune the transceiver to the primary channel during a first time slice 111a, and can tune the transceiver to the secondary channel during a second time slice 111b. The client device 102 can tune the transceiver back to the primary channel during a third time slice 111c, and can tune the transceiver once more to the secondary channel for a fourth time slice 111d, etc. The time slices 111a, 111c, 111e, 111g can each have generally equal durations, and the time slices 111b, 111d, 111f can each have generally equal durations. The time slices 111a-111g may also have varying durations.

The client device 102 can continue to alternate the tuning of the transceiver between the primary channel and the secondary channel during alternating time slices 111a-111g. During successive alternate time slices 111b, 111d, 111f (in other words, during every other time slice 111a-111g), the client device 102 tunes the transceiver to the monitored secondary channel. Between the time slices 111b, 111d, 111f (during which the transceiver is tuned to the secondary channel), the client device 102 tunes the transceiver to the primary channel, i.e., during the time slices 111a, 111c, 111e, 111g. For example, the client device 102 monitors the secondary channel during time slice 111b and time slice 111d, and monitors the primary channel during exactly one time slice 111c in between. The time slices 111a, 111c, 111e, 111g correspond to the times that the transceiver is listening to the primary channel and can thus be referred to as primary time slices. The time slices 111b, 111d, 111f correspond to the times that the transceiver is listening to the secondary channel and can thus be referred to as secondary time slices.

By monitoring a single secondary channel during successive alternate time slices 111b, 111d, 111f, the client device 102 can spend a substantial amount of time monitoring the secondary channel without losing the connection over the primary channel. The client device 102 is configured to thoroughly scan a single secondary channel rather than scanning multiple secondary channels. The scanning of the secondary channel can occur for a particular number of time slices 111b, 111d, 111f, a particular amount of time spent monitoring the secondary channel, or a particular amount of time that elapses since the client device 102 began monitoring the secondary channel. Although monitoring of only a single secondary channel is illustrated, the client device 102 can monitor any of multiple secondary channels. The client device 102 can monitor one secondary channel during successive alternate time slices 111b, 111d, 111f and later monitor a different secondary channel on other successive alternate time slices.

To provide a substantial overall amount of time monitoring the secondary channel, the time slices 111b, 111d, 111f can be longer than the time slices 111a, 111c, 111e, 111g. As a result, for a period of time including many time slices 111a-111g, the client device 102 spends more time with the transceiver tuned to the secondary channel than the time tuned to the primary channel.

For example, the time slices 111b, 111d, 111f may each have a duration of approximately 250 milliseconds (msec), and the time slices 111a may each have a duration of approximately 130 msec. Accordingly, the ratio of the time the receiver is tuned to the secondary channel to the time that the transceiver is tuned to the primary channel can be approximately 2:1. The ratio can also be greater or less than 2:1. For example, the time slices 111b, 111d, 111f may each have a duration of approximately "250 msec," and the time slices 111a may each have a duration of approximately "50 msec." Thus the ratio of the time that the transceiver is tuned to the secondary channel to the time that the transceiver is tuned to the primary channel can be approximately 5:1.

During the time slices 111b, 111d, 111f that the transceiver is tuned to the secondary channel, the client device 102 can receive transmissions (for example, packets, beacons, or other transmissions) from the second access point 106. During the time slices 111b, 111d, 111f, the client device 102 can be configured to only receive information, and to not transmit information to the second access point 106 over the secondary channel.

The duration of the time slices 111a-111g can be set to ensure that the association over the primary channel is maintained. The first access point 104 may terminate an association with the client device 102 if, for example, no transmissions from the client device 102 are received within a timeout threshold. For example, the timeout threshold may be approximately one second or "300 msec." In some instances, the loss of an association disrupts transfers of data over the network 108 and the amount of time required to re-establish a lost association is significant.

To prevent the association from being terminated, the client device 102 can set the duration of the time slices 111b, 111d, 111f to be less than the timeout threshold of the first access point 104. The client device 102 then transmits data to the first access point over the primary channel during each time slice 111a. This ensures that the first access point 104 receives data from the client device 102 before the timeout threshold is reached, preventing the first access point 104 from terminating the association with the client device 102. By maintaining the association, the client device 102 can avoid incurring a re-association delay.

By maintaining the association with the first access point 104, the client device 102 can also continue to transfer data over the primary channel. The client device 102 can exchange data during the time slices 111a over the primary channel so that the user of the client device 102 retains access to the network 108 even though the transceiver is not continuously tuned to the primary channel.

During the time slices 111a that the transceiver of the client device 102 is tuned to the primary channel, data transfers between the client device 102 and the first access point can occur as normal. The client device 102 may not receive the transmissions (e.g., packets) from the first access point 104 during the time slices 111b, 111d, 111f, but the first access point 104 can store packets that were not received by the client device 102. The first access point 104 can resend the packets during one or the time slices 111a when the transceiver of the client device 102 is tuned to the primary channel. Similarly, the client device 102 can store packets to send to the first access point 104 until the transceiver is tuned to the primary channel.

The duration of the time slices 111a can be sufficient to maintain an acceptable data transfer rate that does not disrupt the flow of data between the client device 102 and the network 108. For example, time slices 111a each having a duration of approximately "130 msec" can facilitate reception of broadcast packets and multicast packets, and may support packet-rate-sensitive applications such as Voice over Internet Protocol (VoIP).

During state (D), the second access point 106 transmits a beacon 112 over the secondary channel. The beacon 112 (for example, a beacon frame or beacon packet) can be transmitted periodically to provide information to the client device 102. For example, the beacon 112 can have some or all of the same fields as a standard 802.11 management frame. Unlike standard beacons, the beacon 112 can include information encoded in one or more fields that is not related to wireless connections and associations. For example, the beacon 112 can include information encoded in the SSID field in addition to or instead of information that is used to identify the second access point 106. Other types of management frames and packets besides beacon frames can also be used.

The second access point 106 can be configured to provide information with the beacons 112 but to not invite and to not accept associations with client devices 102. As a result, information that is generally used to establish an association with an access point may be incomplete or omitted entirely from the beacon 112. By contrast, beacons transmitted by a standard access point (for example, the first access point 104), may broadcast beacons to facilitate establishing an association and a connection to the network 108.

The second access point 106 may transmit beacons 112 infrequently, for example, only once each second or once every three seconds. By contrast, a standard access point (for example, the first access point 104) may transmit beacons at short intervals. The first access point 104 may have a beacon transmission interval of, for example, approximately "100 msec."

During state (E), the client device 102 receives the beacon 112 transmitted by the second access point 106 over the secondary channel. For example, the beacon 112 can be received during one or the time slices 111b, 111d, 111f that the receiver of the client device 102 is tuned to the secondary channel.

Because the client device 102 does not continuously monitor the secondary channel, but rather monitors the time slices 111b, 111d, 111f of the secondary channel, the client device 102 may not receive every beacon 112 transmitted by the second access point 106. For example, a beacon 112 transmitted while the transceiver of the client device 102 is tuned to the primary channel may not be received. Nevertheless, because the time slices 111b, 111d, 111f can have a longer duration than the time slices 111a, the client device 102 has an increased likelihood of receiving a particular beacon 112. Indeed, it is likely that few beacons 112 will be missed by the client device 102 before the transmission of a beacon 112 occurs during one or the time slices 111b, 111d, 111f. Because the beacons 112 may be transmitted infrequently, this high likelihood reduces the likely delay between the start of monitoring the secondary channel and the receipt of a beacon 112.

The client device 102 uses the beacon 112 to determine a property of the client device 102 or the second access point 106, without necessarily using the beacon to determine whether to establish an association with the second access point. The client device 102 may be configured to receive beacons without evaluating the potential for association with the second access point 106. The client device 102 can monitor the secondary channel for a purpose other than to determine the potential for connection or association with the second access point 106 or any other access point over the secondary channel.

The client device 102 can extract information from the beacon 112, or derive information from the beacon 112, that indicates a property of the client device 102 or the second access point 106. As an example, one property can include a location of the client device 102 or the second access point 106, for example, a geographic location. Another property may include a temperature. The property can be a property that is not related to connection or association within a wireless network. The beacon 112 can describe a property of the client device 102 even when the client device 102 has transmitted no information to the second access point 106. Similarly, the beacon 112 can describe a property of the client device 102 even when the second access point 106 has received no information about the client device 102 from any source. The property may be a property that is generally applicable to both the client device 102 and the second access point 106.

The extracted information may indicate a property of the client device 102 or the second access point 106. For example, the information extracted from the beacon 112 may include an identifier 113 that can be used to access a property in combination with additional information. The identifier 113 may or may not be unique to the second access point 106. The client device 102 can extract an identifier from the beacon 112 and use the extracted information to determine a property of the client device 102 or the second access point 106.

During state (F), the client device 102 transmits the identifier 113 to a server system 110. The identifier 113 may be transmitted in connection with a request from the client device 102 to provide a particular type of information. For example, the identifier can be transmitted with a query for nearby restaurants or a request for information about the local weather.

During state (G), the server system 110 uses the identifier 113 to determine a property of the client device 102 or the second access point 106, and sends information based on the property to the client device 102, for example, as a web page 119. The property can be directly or indirectly indicated by the identifier 113.

For example, the server system 110 receives the identifier 113 in connection with a request for the weather at the location of the client device 102, but the location of the client device 102 may be unknown or imprecise. The identifier can indicate the location of the client device 102. For example, the identifier 113 can indicate the location of the second access point 106, and the second access point 106 can be located in the same general location of the client device 102. The server system 110 determines the location of the client device 102 using the identifier 113, for example, by accessing information that associates the identifier 113 with a particular location.

The server system 110 provides information to the client device 102 based on the property determined using the identifier 113. For example, the server system 110 can determine information about the current or forecasted weather at the location determined using the identifier 113. The server system 110 transmits the weather information to the client device 102.

During state (H), the client device 102 displays information received from the server system 110. The information may be displayed on, for example, the user interface 120. The information displayed is based on the property that was determined using the identifier 113 from the beacon 112. For example, the information displayed may include a description of the current weather at the location of the client device 102, where the location was determined using the identifier 113.

The client device 102 can execute a computer program that causes the changes in tuning of the transceiver of the client device 102 to occur. For example, the client device 102 may execute the computer code in Table 1 to build a scan request that alternates between the primary channel and the secondary channel.

TABLE 1

```
single_channel_scan(channel, time) {
  /* Build the scan request */
  set_scan_header(buf);
  i = (time - 1) / 250 + 1;
  j = 0;
  while ( j < i ) {
    add_to_scan_request(buf,
      channel, 250);
    j++;
  }
  set_home_channel_time(buf, 130);
  send_scan_request(buf);
}
```

The code in Table 1 may be included in a program that can control wireless connections and transceiver functions of the client device 102, for example, a supplicant according to 802.1x specifications, such as the wpa_supplicant code. The function "single_channel_scan" is a function that generates a scan request that alternates between the primary channel (or "home channel") and the secondary channel. The function receives two parameters, "channel" and "time," which may each be a value, a data structure, or a reference to a value or data structure. The channel parameter identifies the particular secondary channel to scan during the time slices 111b, 111d, 111f. The time parameter indicates that total amount of time that the client device 102 should spend scanning the secondary channel, in milliseconds.

The "set_scan_header" function fills a buffer named "buf" with initial control and formatting information for the scan request. A variable named "i" receives a value that equals the number of time slices 111b, 111d, 111f required to achieve the total scanning time indicated by the time parameter. The number "250" indicates that the duration of each time slice 111b, 111d, 111f should be "250 msec." For example, if the time parameter is 10,000, then the value of the variable i would be 40 (or (10000−1)/250+1), indicating that the transceiver should be tuned to the secondary channel for a total of 40 time slices 111b, 111d, 111f, each with a duration of "250 msec." The loop counter variable "j" is initialized to zero. The while loop then begins, and continues while j is less than i. For each iteration of the while loop, (i) a scan request for a single time slice 111b, 111d, 111f is appended to the buffer with the function "add_to_scan_request" and (ii) the variable j is incremented. The function receives parameters: buf, the destination buffer for the appended information; channel, the variable that identifies the secondary channel; and a literal value of 250, which indicates the duration of each time slice 111b, 111d, 111f, in milliseconds. Ultimately, the while loop executes for the number of iterations indicated in the variable i.

After termination of the while loop, the "set_home_channel_time" function is invoked to append to the scan request the duration of time that the transceiver of the client device 102 should be tuned to the primary channel. For example, the function can append to the buffer information that indicates that the transceiver should be tuned to the primary channel for "130 msec," as indicated by the parameter "130" passed to the function. The scan request, stored in the buffer buf, is transmitted by invoking the function "send_scan_request." The scan request can then be carried out by other programs and hardware devices to perform the functions described above.

Figure 2:
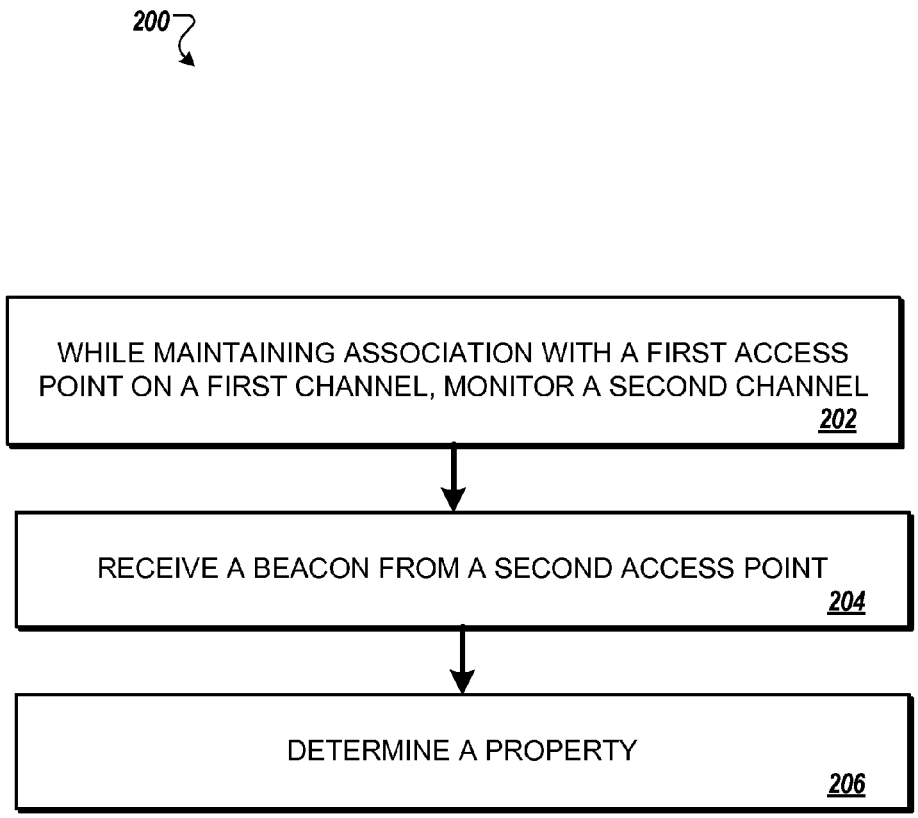
FIG. 2 is a flow diagram illustrating a process for channel scanning

FIG. 2 is a flow diagram illustrating a process 200 for channel scanning. Briefly, the process includes (i) while maintaining an association with a first access point on a first channel during first, second, and third consecutive time slices, monitoring a single second channel during the first time slice and the third time slice, and monitoring the first channel during the second time slice, (ii) receiving a beacon from a second access point during first time slice or the third time slice, (iii) and determining a property of the client device or the second access point using the beacon, without using the beacon to determine whether to establish an association with the second access point.

In further detail, while maintaining an association on a first channel during first, second, and third consecutive time slices, the second channel is monitored during the first and third time slices, and the first channel is monitored during the second time slice (202). A transceiver of the client device can maintain the association with the first access point and the same transceiver can monitor the single secondary channel.

During the third time slice, the transceiver can be tuned to the first channel. Data can be exchanged during the portion of time that the transceiver is tuned to the first channel. The portion of time that the transceiver is tuned to the secondary channel can be greater than a beacon transmission interval of the first access point, for example, greater than approximately 100 milliseconds. The ratio of time that the transceiver is tuned to the secondary channel to the time that the transceiver is tuned to the first channel can be greater than 2:1. The ratio of time that the transceiver is tuned to the secondary channel to the time that the transceiver is tuned to the first channel can be approximately 5:1. The first time slice and the third time slice can each have a duration of approximately 250 milliseconds, and the second time slice can have a duration of approximately 50 milliseconds.

A beacon from a second access point is received during the first time slice or the third time slice (204). The beacon can be received over the secondary channel while the transceiver is tuned to the secondary channel. One or more beacons can be received during both the first time slice and the third time slice.

A property of the client device or the second access point can be determined using the beacon (206). The property is determined without using the beacon to determine whether to establish an association with the second access point. The property can be a property that is not related to connection or association within a wireless network. The property can be the location of the client device or the second access point. In some implementations, signal strength of transmissions from the second access point can be used to approximate the distance between the client device and the second access point.

Determining the property can include extracting an identifier from the beacon and using the identifier to determine the property. For example, determining the property may include transmitting the identifier to a server system and receiving a property indicated, at least in part, by the identifier.

The process 200 can also include displaying information associated with the property. The client device can receive information associated with the property. For example, when the property indicates a location, the information can include information about weather, stores, or traffic near the location.

The process 200 can also include determining that the beacon was not transmitted to facilitate association with the second access point. The process 200 can also include determining that the beacon indicates a non-connection-related property of the client device or the access point.

Figure 3:
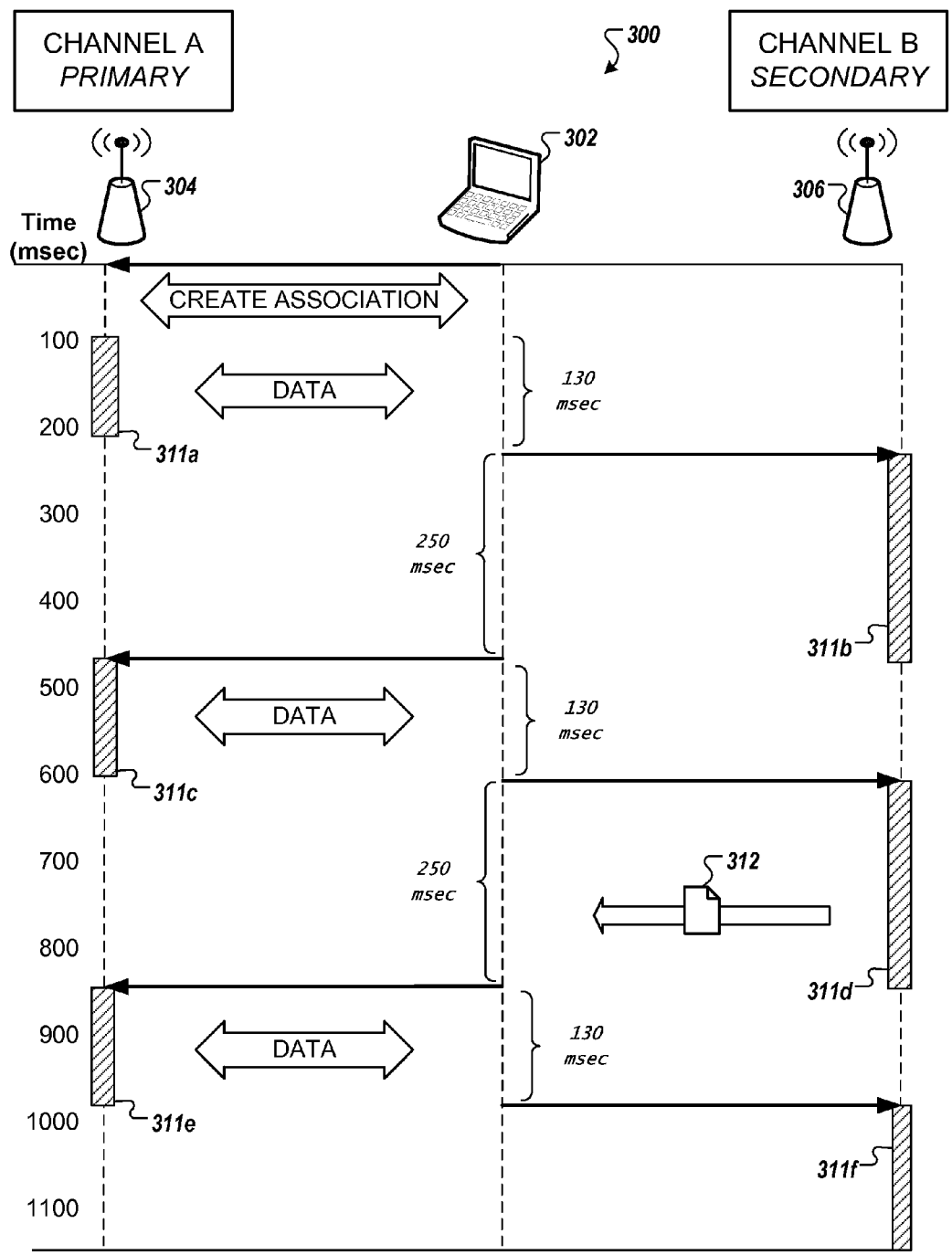
FIG. 3 is a swim lane diagram illustrating channel scanning.

FIG. 3 is a swim lane diagram 300 illustrating channel scanning. The diagram 300 shows the tuning of a transceiver (transmitter and receiver) of a client device 302. The diagram 300 also illustrates the interaction of the client device 302 with the first access point 304 and a second access point 306 during various time slices 311a-311f. The first access point 304 communicates over the primary channel (in the figure "channel A"), and the second access point 306 communicates over the secondary channel (in the figure, "channel B").

The client device 302 monitors the secondary channel during successive alternate time slices 311b, 311d, 311f. In between each of the time slices 311b, 311d, 311f, the receiver of the client device 302 is tuned to the primary channel, for example, during time slices 311c, 311e.

The client device 302 initially tunes a receiver to the primary channel and establishes an association with the first access point 304. The first access point 304 and the client device 302 exchange data over the primary channel during the first time slice 311a. The first time slice 311a has a duration of approximately "130 msec."

The client device 302 tunes the receiver to the secondary channel and listens for transmissions from the second access point 306 during the second time slice 311b. The client device 302 does not transmit any data to the second access point 306.

The second time slice has a duration of approximately "250 msec," which is longer than the duration of the first time slice 311a.

The client device 302 then tunes the receiver back to the primary channel to begin the third time slice 311c, the channel on which the association with the first access point 304 is ongoing. The client device 302 and the first access point 304 exchange data. Because the first access point 304 receives transmissions from the client device 302 at least periodically, the first access point 304 will not terminate the association with the client device 302. The duration of the third time slice 311c is approximately "130 msec," the same as the duration of the first time slice 311a.

The client device 302 tunes the receiver to the secondary channel for the fourth time slice 311d. During the fourth time slice 311d, the second access point 306 transmits a beacon 312 over the secondary channel. Because the receiver of the client device 302 is tuned to the secondary channel, the client device 302 receives the beacon 312. The client device 302 can process the beacon 312, for example, to determine a property of the client device or the second access point 306. The client device 302 does not respond to the beacon 312 and does not use the beacon to determine whether to establish an association with the second access point 306. The fourth time slice 311d has a duration of approximately "250 msec," the same as the duration of the time slice 311b.

The client device 302 tunes the receiver to the primary channel during the fifth time slice 311e. The client device 302 can continue to alternate the tuning of the receiver, to monitor the secondary channel during alternate time slices 311b, 311d, 311f, and to tune to the primary channel and exchange data during the other time slices 311a, 311c, 311e. The duration of the various time slices 311a-311f can vary. For example, the time slices 311a, 311c, 311e during which the receiver of the client device 302 is tuned to the primary channel may be "50 msec" instead of the "130 msec" illustrated.

A number of implementations have been described. Nevertheless, it will be understood that various modifications may be made without departing from the spirit and scope of the disclosure. For example, various forms of the flows shown above may be used, with steps re-ordered, added, or removed.

Implementations and all of the functional operations described in this specification can be implemented in digital electronic circuitry, or in computer software, firmware, or hardware, including the structures disclosed in this specification and their structural equivalents, or in combinations of one or more of them. Implementations can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, processes can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Processes can be implemented in a computing system that includes a back end component, e.g., as a data server, or that includes a middleware component, e.g., an application server, or that includes a front end component, e.g., a client computer having a graphical user interface or a Web browser through which a user can interact with any implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on scope or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations have been described. Other implementations are within the scope of the following claims. For example, the steps recited in the claims can be performed in a different order and still achieve desirable results.

What is claimed is:

1. A computer-implemented method, comprising:
   alternating, in a series of multiple consecutive time periods, between monitoring a first channel with a transceiver of a client device during one of the consecutive time periods and monitoring a second channel with the transceiver during another of the consecutive time periods;
   while maintaining a logical association between the client device and a first access point on the first channel, receiving, by the client device, a beacon over the second channel from a second access point without establishing a logical association between the client device and the second access point; and
   determining a property of the client device using the beacon received over the second channel from the second access point while maintaining the logical connection between the client device and the first access point, and without establishing a logical connection between the client device and the second access point.

2. The computer-implemented method of claim 1, wherein monitoring the second channel with the transceiver comprises monitoring the second channel for time periods having a duration different from a duration of time periods in which the first channel is monitored.

3. The computer-implemented method of claim 2, wherein monitoring the second channel comprises monitoring the second channel for time periods having a duration longer than the duration of time periods in which the first channel is monitored.

4. The computer-implemented method of claim 3, wherein monitoring the second channel comprises monitoring the second channel for time periods having a duration at least twice the duration of time periods in which the first channel is monitored.

5. The computer-implemented method of claim 3, wherein monitoring the second channel comprises monitoring the second channel for time periods having a duration approximately five times the duration of time periods in which the first channel is monitored.

6. The computer-implemented method of claim 1, wherein monitoring the second channel with the transceiver comprises monitoring the second channel in time periods that each have a duration greater than a beacon transmission interval of the first access point.

7. The computer-implemented method of claim 6, wherein monitoring the second channel with the transceiver comprises monitoring the second channel in time periods that each have a duration less than an association timeout interval of the first access point.

8. The computer-implemented method of claim 1, further comprising:
   extracting information from the received beacon;
   receiving a query;
   transmitting the extracted information and the query to a server system over a network; and
   receiving, over the network, a web page comprising data generated using the extracted information and the query.

9. The computer-implemented method of claim 1, wherein, while maintaining the logical association between the client device and the first access point on the first channel, receiving, by the client device, the beacon over the second channel from the second access point without establishing a logical association between the client device and the second access point comprises:
   receiving, by the client device, the beacon over the second channel from the second access point while maintaining an association of the client device with the first access point that provides the client device with bi-directional communication over a network.

10. A system comprising:
    one or more computers; and
    a non-transitory computer-readable medium coupled to the one or more computers having instructions stored thereon which, when executed by the one or more computers, cause the one or more computers to perform operations comprising:
       alternating, in a series of multiple consecutive time periods, between monitoring a first channel with a transceiver of a client device during one of the consecutive time periods and monitoring a second channel with the transceiver during another of the consecutive time periods;

while maintaining a logical association between the client device and a first access point on the first channel, receiving, by the client device, a beacon over the second channel from a second access point without establishing a logical association between the client device and the second access point; and determining a property of the client device using the beacon received over the second channel from the second access point while maintaining the logical connection between the client device and the first access point, and without establishing a logical connection between the client device and the second access point.

11. The system of claim 10, wherein monitoring the second channel comprises monitoring the second channel for time periods having a duration longer than the duration of time periods in which the first channel is monitored.

12. A computer storage device storing a computer program, the program comprising instructions that when executed by one or more computers cause the one or more computers to perform operations comprising:

alternating, in a series of multiple consecutive time periods, between monitoring a first channel with a transceiver of a client device during one of the consecutive time periods and monitoring a second channel with the transceiver during another of the consecutive time periods;

while maintaining a logical association between the client device and a first access point on the first channel, receiving, by the client device, a beacon over a second channel from the second access point without establishing a logical association between the client device and the second access point; and determining a property of the client device using the beacon received over the second channel from the second access point while maintaining the logical connection between the client device and the first access point, and without establishing a logical connection between the client device and the second access point.

13. The computer storage device of claim 12, wherein monitoring the second channel comprises monitoring the second channel for time periods having a duration longer than the duration of time periods in which the first channel is monitored.

14. The computer storage device of claim 12, wherein monitoring the second channel comprises monitoring the second channel for time periods having a duration at least twice the duration of time periods in which the first channel is monitored.

15. The computer storage device of claim 12, wherein monitoring the second channel comprises monitoring the second channel for time periods that each have a duration less than an association timeout interval of the first access point.

16. The system of claim 10, wherein monitoring the second channel comprises monitoring the second channel for time periods having a duration at least twice the duration of time periods in which the first channel is monitored.

17. The system of claim 10, wherein monitoring the second channel comprises monitoring the second channel for time periods that each have a duration less than an association timeout interval of the first access point.

18. The method of claim 1, wherein receiving the beacon over the second channel from the second access point comprises receiving a beacon that includes an identifier for a geographical location; and wherein determining the property of the client device using the beacon received over the second channel from the second access point comprises determining a geographical location of the client device based on the identifier.

19. The system of claim 10, wherein receiving the beacon over the second channel from the second access point comprises receiving a beacon that includes an identifier for a geographical location; and wherein determining the property of the client device using the beacon received over the second channel from the second access point comprises determining a geographical location of the client device based on the identifier.

20. The computer storage device of claim 12, wherein receiving the beacon over the second channel from the second access point comprises receiving a beacon that includes an identifier for a geographical location; and wherein determining the property of the client device using the beacon received over the second channel from the second access point comprises determining a geographical location of the client device based on the identifier.

\* \* \* \* \*